Patented Jan. 24, 1928.

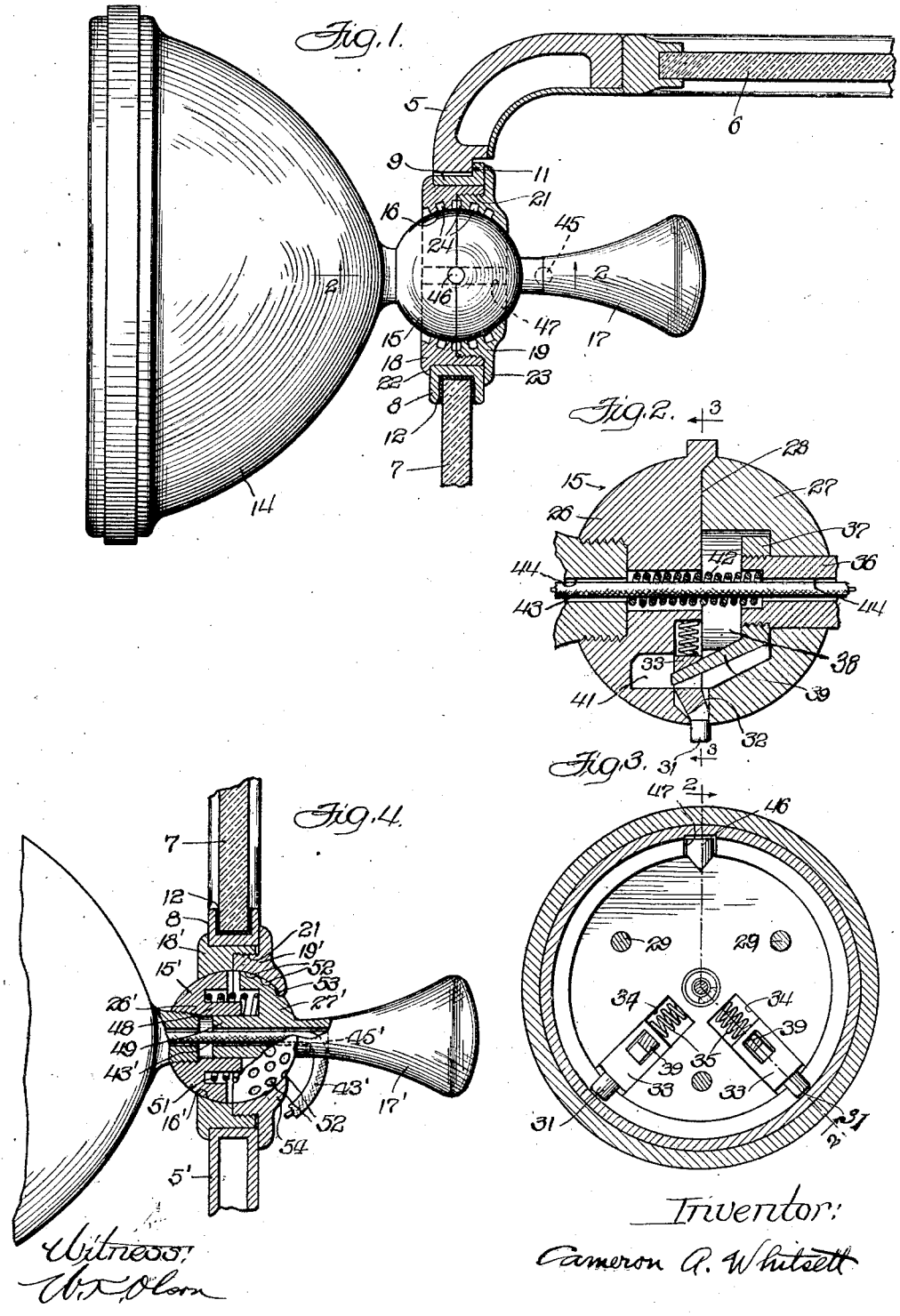

1,657,141

UNITED STATES PATENT OFFICE.

CAMERON A. WHITSETT, OF CHICAGO, ILLINOIS, ASSIGNOR, BY MESNE ASSIGNMENTS, TO THE CLYMER MANUFACTURING COMPANY, OF ROCKFORD, ILLINOIS, A CORPORATION OF COLORADO.

SPOTLIGHT.

Original application filed August 15, 1921, Serial No. 492,275. Divided and this application filed May 25, 1922. Serial No. 563,631.

The present invention relates to spot lamps for automobiles, motor boats, and the like and is divisional of my co-pending application Serial No. 492,275 filed August 15, 1921.

More specifically, the invention is concerned with that type of spot lamp which, in the automobile adaptation, is operable from a control member located within the driver's compartment. The preeminent advantage of this construction resides in the ability to operate the spot lamp from within the car in any type of car, and under any condition. Spot lamps having this interior control feature are particularly adaptable to use on limousines, and other closed cars and, in fact, are the only types of spot lamps which can be practically mounted on a closed type of car. Similarly, in the case of the open body car, this control feature permits convenient operation of the spot lamp when the side curtains of the car are down, without the objectionable necessity of unfastening the side curtains, and exposing the hand or arm to the weather.

One of the fundamental objects of the invention is to provide such a construction of lamp employing an improved arrangement of ball and socket joint which can be mounted directly in the windshield, or in the corner rail or adjacent part of the car.

A further object of the invention is to provide improved means for holding the lamp in an adjusted position. This restraining means may utilize spring pressure exerted preferably between the ball and socket or it may take the form of a positive lock for holding the ball positively in the socket. When embodied in the form of a positive lock this lock is so devised that its operation does not hinder or encumber the adjustment of the lamp.

Another object of the invention is to provide an improved construction of spherical socket which can be assembled and mounted in the windshield with ease and facility, and a still further object is to provide an improved manner of mounting this socket so that it will be cushioned against causing injury to the windshield glass.

Other objects will appear in the following description taken in connection with the accompanying drawing, in which:

Fig. 1 is a horizontal sectional view through one form of my invention;

Fig. 2 is a longitudinal sectional view on an enlarged scale, taken on the plane of the line 2—2 of Fig. 1 and on the plane of the line 2—2 of Fig. 3;

Fig. 3 is a transverse sectional view taken on the plane of the line 3—3 of Fig. 2; and Fig. 4 is a fragmentary sectional view, similar to Fig. 1, of a modified construction.

Fig. 1 illustrates my improved type of lamp mounted directly in the windshield or corner rail, this figure representing a horizontal sectional view through the body of the automobile adjacent one end of the windshield. One of the corner posts or standards for supporting the top is indicated at 5, and a side panel or door is indicated at 6. The windshield glass is represented at 7. The spot lamp is designated 14 and is supported on a ball 15 which is mounted in a spherical socket 16. The manner of mounting the socket 16 may be modified widely within the scope of the invention, either in accordance with the circumstances of the particular installation, or in accordance with the wishes of the manufacturer or user. For example, the spherical socket may be mounted wholly within the glass of the windshield so as to be supported entirely by the glass; or it may be mounted at the margin of the windshield so as to be supported partly or entirely by the marginal rail which faces the edge of and moves with the windshield. Obviously, instead of either of these the socket could be supported directly in the corner rail or standard 5.

In Figure 1 the spherical socket is shown as having a member 8 of channel section engaged by the socket. This channel member may be extended around the socket in either an opening or a marginal recess in the windshield glass. In the latter instance, this channel member can, if desired, be secured to the marginal rail extending along the edge of the glass. This marginal rail may be considered as either the upper side of bottom rail of the windshield. The rail 9 is preferably of angular section and abuts the shoulder 11 on the corner standard 5. To prevent the weight and jarring of the lamp from cracking or otherwise injuring the glass, gaskets, or a facing of rubber, cork or other suitable cushioning material may be interposed between the glass 7 and the metallic structure of the lamp mounting as indicated at 12; this cushioning material also preventing any pressures exerted by the socket sections or by the channel member 8, from injuring the glass. The cushioning material is preferably interposed between the glass and the lamp mounting on each side of the glass and may also be extended to line the inner surface of the recess or opening in the glass. The handle 17 for manipulating the ball and lamp extends into the driver's compartment in convenient position for operation.

The socket 16 is constructed of front and rear sections 18 and 19 which are mounted in the front and rear ends of the opening in the glass. These sections are formed with cooperating semi-spherical depressions which combine to produce the socket 16. One or both of the socket sections has a flange or hub extending into the mounting opening for holding the socket against lateral play therein; in the construction illustrated both of the sections being formed with overlapping flanges which thread together as indicated at 21. The front socket section 18 is provided with a flange 22 which overlaps the front of the channel strip and marginal rail, and the rear socket section 19 is provided with a similar flange 23.

Where the positive locking function is desired, the inner faces of these socket sections are formed spherical and are provided with annular grooves 24 extending parallel with the diametrical line of separation between the sections. These grooves are preferably cut so that their lateral walls extend inwardly towards the center of the spherical socket on a substantially radial plane the center groove being formed by uniting half grooves cut in the opposing faces of both socket sections.

For engaging in these locking grooves 24, the ball 15 is provided with a plurality of small plungers 31 which are adapted to be projected into or out of the ball in accordance with the position or actuation of the handle 17. As shown in Figs. 2 and 3, the ball 15 is constructed of front and rear semispheres 26 and 27 which are united on the diametrical plane 28 by screws or pins 29. If desired these pins or screws can be arranged to permit a limited expansion of the ball, in the socket for securing a tight fit and for frictionally restraining the ball in the socket. The locking plungers 31 are adapted to be projected outwardly of the sphere through openings 32 formed in the opposing faces of the sections 26 and 27 on the diametrical plane 28. Each plunger 31 constitutes part of a spring pressed block 33 which is adapted for reciprocation in the radial guideways 34 formed in the face of the front spherical section 26. Each block 33 is normally thrust outwardly under the action of a compression spring 35 in the inner end of the guideway. These locking plungers are adapted to be retracted into the confines of the sphere 15 by merely thrusting the control handle 17 forwardly into the sphere 15. The cylindrical neck portion 36 of the handle is guided for reciprocating motion in the rear ball section 27 and the inner end of this neck portion is threaded for the reception of a collar 37 which operates in a cylindrical recess 38 in the rear section. For each sliding block 33 there is provided an inclined arm 39 projecting from the collar 37. Each inclined arm engages in a slot in its corresponding block 33, the arm bearing on an inclined face in the slot. A narrow recess 41 is provided in front of each block 33 for receiving the arm 39 when the same is thrust inwardly. A compression spring 42 extends from a bore in the front ball section 26, and bears against the end of the handle 17 to normally thrust the handle 17, the cam arms 39, and possibly the rear ball section 27 backwardly.

It will be noted from the foregoing that by merely thrusting the handle 17 forwardly, the cam arms 39 retract all of the locking plungers 31 from the annular grooves 24 in the socket and permit the lamp to turn to any position. Upon releasing the handle 17, the same is thrust backwardly by the compression spring 42 which acts to thrust the locking plungers 31 outwardly into one or more of the locking grooves 24. It will be apparent that by an obvious reversal of the slope of the cams 39 the handle 17 may be made to release the positive lock by a backward pull on the handle, if such motion should be more desirable. The conducting cord 43 is extended backwardly through the ball and socket joint through aligned bores 44 in the lamp stem and in the handle, this cord being led downwardly out of the handle thru a hole 45 intersecting the bore 44.

I have only shown two interlocking plungers 31 spaced at 90°. By this arrangement, if one of the locking plungers should coincide with the axis of adjustment or inclination of the lamp, the other plunger would nevertheless be in position to lock the lamp by engaging in one of the grooves 24. It will be apparent, of course, that three or even more of these locking plungers 31 could be provided in the sphere 15, and with any desired spacing between the plungers. Where it is desirable that the sphere 15 be incapable of axial rotation in the socket 16, as for preventing the cord 43 from being twisted off, the sphere may be provided with a pin projection 46 for engaging in a groove 47 extending axially of the socket 16 and lamp 14. For cooperating with the locking plungers 31—31, this pin is preferably located intermediate the locking plungers as shown in Fig. 3, the pin and groove connection between the ball and socket preventing rotation of one relative to the other, but permitting free angular adjustment of the ball into any position.

In Fig. 4, the separation of the ball sections under the action of the compression spring therebetween is utilized to obtain a positive as well as a frictional lock between the ball and socket member. The socket 16′ is constructed similarly to the above socket by the joining of the front and rear socket sections 18′—19′. The front ball section 26′ is formed with a boss 48 which has a suitable mounting upon an extension 49 projecting from the rear ball section 27′. A compression spring 51, which is recessed into each ball section, normally spreads the two ball sections apart into firm contact with the walls of the spherical socket. As above indicated, this compression pressure which the spring 51 normally exerts between the ball and the socket may be utilized alone as a frictional detent or restraining means for holding the ball in any desired position. Where a positive locking function is desired, however, this function is obtained by providing a plurality of locking recesses 52 closely grouped about the surface of the rear ball. These recesses are adapted for cooperating with a spherical locking detent or hump 53, which is carried on the rear socket section 19′. This hump is preferably positioned at the inner end of the flange 54 in proximity to the longitudinal axis of the ball and handle 17′, so that the hump will be able to clear itself of the locking recesses 52 when the handle 17′ is thrust inwardly. When the handle 17′ is released after the setting of the lamp, the compression spring 51 thrusts the rear ball section backwardly into frictional contact with the socket and engages the locking hump 53 in the nearest locking recess 52, thereby locking the lamp in adjusted position. The relation of recesses and hump may, of course, be reversed by forming the hump on the sphere and the recesses in the socket. It is also possible to obtain this positive locking function by serrating the opposing faces of the ball and socket portions 27′ and 19′, as by roughly scoring these faces and hardening the surfaces to prevent wear. The conducting cord 43′ is extended through the ball and socket joint and out through the handle 17′ in substantially the same manner as above described. This form of ball and socket joint may also be provided with a pin 46 and longitudinal groove 47 to prevent rotation between the ball and socket if desired. Instead of being cylindrical as above described, the extension 49 may be of any polygonal formation for reception in a similarly formed bore in the boss 48 so as to prevent relative rotation between the front and rear ball sections 26′ and 27′.

It will be apparent, of course, that numerous changes may be made in the particular embodiment herein shown without departing from the spirit and scope of the invention.

I claim:

1. In a spot light adapted for mounting in automobile wind shields, the combination of a socket comprising two socket sections engaging in an opening in the wind shield, each of said socket sections having an opening therethrough, a spot light, universal mounting means in said socket connected to said spot light through the opening in the outer socket section, a handle for actuating said spot light through the opening in the inner socket section, said handle having universal angular motion relative to said socket, and also having a separate lock actuating motion, and lock means movable with said mounting means and having operative connection with said handle, whereby said lock means is actuated by the lock actuating motion of said handle.

2. In a spot light adapted for mounting in automobile wind shields, the combination of a spherical socket comprising two socket sections, flanges adapted to engage on opposite sides of the wind shield for holding said socket in the windshield, each of said socket sections having an opening therethrough, a spot light, a spherical mounting member in said socket connected to said spot light through the opening in the outer socket section, a handle for actuating said spherical mounting member through the opening in the inner socket section, said handle having universal angular motion relative to said socket, and lock means operated by axial movement of said handle.

3. In a spot light adapted for mounting in automobile wind shields, the combination of a socket adapted for mounting in an opening in an automobile wind shield, a spot light, mounting means in said socket connected to said spot light, a handle for actuating said mounting means, said operating handle having universal angular motion relative to said socket, detent means tending to hold said spot light in its different positions of adjustment, and a spring, the pressure of which is overcome solely by motion of said handle, for rendering said detent means effective.

4. In a spot light adapted for mounting in automobile wind shields, the combination of a socket comprising two socket sections adapted for mounting in an opening in the automobile wind shield, each of said socket sections having an opening therethrough, a spot light, mounting means in said socket connected to said spot light through the opening in the outer socket section, a handle for actuating said mounting means through the opening in the inner socket section, said handle having universal angular motion relative to said socket and a separate endwise motion, detent means tending to hold said spot light in its different positions of adjustment, said detent means comprising a spring for rendering said detent means effective, and means for varying the pressure of said spring by the endwise motion of said handle.

5. In a spot light adapted for mounting in automobile wind shields, the combination of a socket and co-operating mounting means having universal angular adjustment in said socket, means for securing said socket in an opening in the wind shield, a spot light for disposal on the outside of the wind shield connected to said co-operating mounting means, an operating handle for actuating said spot light by the direct transmission of all adjusting motion to said spot light through said mounting means and lock means releasable by movement of the handle relatively through a portion of said mounting means for holding the spot light in its different positions of adjustment, said lock means relocking the spot light automatically after each adjustment.

6. In a spot light adapted for mounting in automobile wind shields, the combination of a socket and co-operating mounting means having universal angular adjustment in said socket, means for securing said socket in an opening in the wind shield, a spot light for disposal on the outside of the wind shield connected to said mounting means, an operating handle for actuating said spot light directly through said mounting means from the inside of the wind shield, and detent means for holding the spot light in different positions of adjustment, said detent means being operable by movement of said operating handle.

7. In a spot light adapted for mounting in automobile wind shields, the combination of a socket comprising inner and outer socket sections, said socket sections having aligned openings therethrough, a pair of flanges carried by said socket and engageable upon opposite sides of the wind shield, cushioning means of pliable material interposed between said flanges and the wind shield glass, mounting means having universal angular adjustment in said socket, and interlockingly engaged with the interior of one of said socket sections, a spot light for disposal on the outside of the wind shield connected to said mounting means through the opening in said outer socket section, an operating handle having connection with said mounting means and interlockingly engaged with the interior of one of said socket sections through the opening in said inner socket section, one of said socket sections having a hub portion extending into the aperture in said wind shield, and having a screw thread, the other of said socket sections having a co-operating screw thread for engaging with said hub portion.

In witness whereof, I hereunto subscribe my name this 23rd day of May, 1922.

CAMERON A. WHITSETT.